United States Patent [19]

Foster et al.

[11] Patent Number: 5,588,105

[45] Date of Patent: Dec. 24, 1996

[54] STATUS BAR FOR APPLICATION WINDOWS

[75] Inventors: Gregg S. Foster, Woodside; Stephen P. Capps, San Carlos, both of Calif.

[73] Assignee: Apple Computer, Inc., Cupertino, Calif.

[21] Appl. No.: 393,880

[22] Filed: Feb. 24, 1995

Related U.S. Application Data

[63] Continuation of Ser. No. 976,970, Nov. 16, 1992, abandoned.

[51] Int. Cl.$^6$ .............................. G06F 3/14; G06F 3/033
[52] U.S. Cl. ............................................. 395/326; 395/348
[58] Field of Search .................................. 395/155, 157, 395/159, 156, 158; 345/119, 120, 146, 902

[56] References Cited

U.S. PATENT DOCUMENTS

| | | | |
|---|---|---|---|
| 4,931,783 | 6/1990 | Atkinson | 345/146 X |
| 5,121,477 | 6/1992 | Koopmans et al. | 395/156 |
| 5,140,678 | 8/1992 | Torres | 395/159 |
| 5,179,655 | 1/1993 | Noguchi et al. | 395/158 |
| 5,230,063 | 7/1993 | Hoeber et al. | 395/156 |
| 5,255,358 | 10/1993 | Busboom et al. | 395/156 X |
| 5,276,795 | 1/1994 | Hoeber et al. | 395/156 |
| 5,305,435 | 4/1994 | Bronson | 395/159 |
| 5,317,687 | 5/1994 | Torres | 395/159 |
| 5,375,200 | 12/1994 | Dugan et al. | 395/159 |
| 5,425,141 | 6/1995 | Gedye | 395/157 |

OTHER PUBLICATIONS

Microsoft Windows Version 3.0 User's Guide, Microsoft Corporation, 1990, pp. 17–18, 23–25, 28–29, 44–47, 55–56, 156–157, 398–399.

O'Connor, Rory J., "Apple banking on Newton's brain," San Jose Mercury News, Apr. 22, 1992.

Weiman et al, "A Step Toward the Future" Macworld, Aug. 1992, pp. 129–131.

M. Soviero, "Your World According to Newton" Popular Science, Sep. 1992, pp. 45–49.

F. Abatemarco, "From the Editor" Popular Sceince, Sep. 1992, p. 4.

Primary Examiner—Raymond J. Bayerl
Attorney, Agent, or Firm—Hickman Beyer & Weaver

[57] ABSTRACT

A status bar characterized by a template generated independently of an application program and displayed on a computer screen in contact with an application window. The template carries at least one active area that can include an icon for controlling the application program or an area which displays information generated by the application program. Alternatively, or additionally, the active area can include "global functions" of the computer system. A method for providing a status bar is characterized by the steps of creating a status bar template having at least one area to be activated, activating at least one area to create a status bar, and displaying the status bar on a computer screen in contact with an associated application window displayed on the computer screen. The step of creating a status bar template can include the steps of creating a plurality of status bar templates, one of which is chosen to be attached to a particular application window.

40 Claims, 11 Drawing Sheets

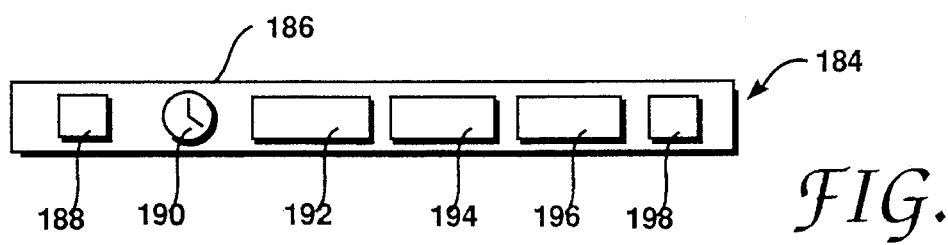
FIG. 11
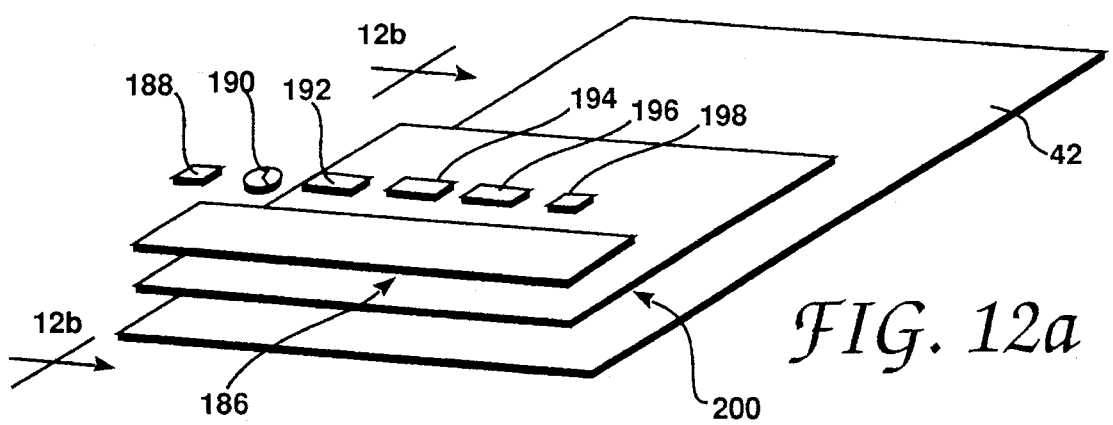
FIG. 12a
FIG. 12b
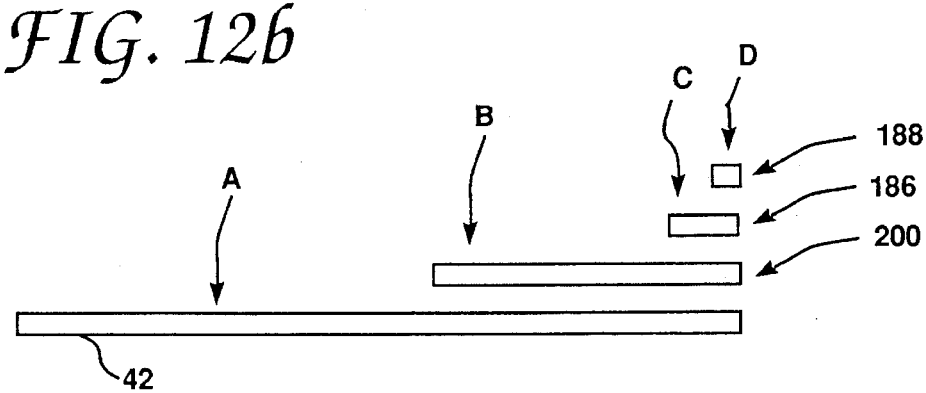

STATUS BAR FOR APPLICATION WINDOWS

This is a continuation of application Ser. No. 07/967,970 filed Nov. 16, 1992, now abandoned.

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

Apple Computer, Inc. is widely credited with popularizing graphical user interfaces with the GUI provided on their Macintosh line of computers. The Macintosh GUI includes a "desk top" area occupying most of the computer screen, a menu bar provided along the top of the screen which provides a number of pull-down menus that can be activated with a pointing device, such as a mouse or track ball. The output of application programs can be displayed on the screen within a "window" which can cover part or all of the desk top. The menu bar, however, is always visible and will always display certain system required functions regardless of which application program is currently active.

When multiple windows are open on the screen, it can, at times, become confusing as to which application is currently active and which application is being controlled by the menu bar. For example, even though the Macintosh GUI causes a title bar associated with an active window to have a distinctive shading, users still sometimes mistake a non-active window for the active window and try to operate on the non-active window with the menu bar.

Some graphical user interfaces, such as X-window and some graphical UNIX user interfaces, permit multiple active windows on a computer screen. While such systems are advantageous in that several application programs can be run at the same time, the user interface becomes more complex since each application program can provide its own, idiosyncratic interface to a user. This added complexity decreases user efficiency and increases learning time.

In view of the foregoing, it would be desirable to have similar user interfaces associated with any application program window which might be displayed on a screen. With such an system, it would be immediately clear which application was being acted upon, and user efficiency would be increased due to standardization of the interface.

SUMMARY OF THE INVENTION

The present invention overcomes the disadvantage of the prior art with a "status bar" which is attached to open application windows. Since the status bar is attached directly to the application window, there is no ambiguity as to which window that status bar controls. Furthermore, the status bar has a common format to provide a more uniform graphical user interface for the user of the computer system.

A status bar in accordance with the present invention includes a status bar template generated independently of an application program which is displayed on a computer screen in contact with an application window. The status bar template carries at least one active area. The active area can include an icon which, if activated, can control an operation of the application program. The active area can also be used to display information derived from the application program, display information derived from the computer system ("global information"), or control a function of the computer system ("global control").

A method for providing a status bar includes the steps of creating a status bar template having at least one area to be activated; activating the area to create a status bar for that application; and displaying the status bar on a computer screen in contact with an associated application window. The step of creating a status bar template can include creating a number of alternative status bar templates, in which case an additional step of selecting one of the status bar templates is performed. Again, the active area can control a function of the application program, display information from the application program, display global information, or it can control a function outside of the application program.

A major advantage of the present invention is that the status bar is attached directly to an application window so there is no ambiguity as to which application program that status bar controls. Another advantage of the status bar is that it can be configured by the application program with application specific features. Furthermore, the status bar ensures a common graphical user interface which makes the status bar functions easy to learn and use.

BRIEF DESCRIPTION OF THE INVENTION

FIG. 11 illustrates a completed status bar object;

FIGS. 12A and 12B illustrates the "Install New Area" step 158 of FIG. 9;

DETAILED DESCRIPTION OF THE PREFERRED EMBODIMENT

The present invention is well suited for pointer based computer systems such as the pen-based, stylus-based and mouse driven systems that are currently popular. For the purposes of illustration, the invention will be described in connection with a pen-based system. However, the present invention is well suited to any computer system using a window-type graphical user interface (GUI), or for non-window interfaces where a common user interface for application programs is desired.

Figure 1:
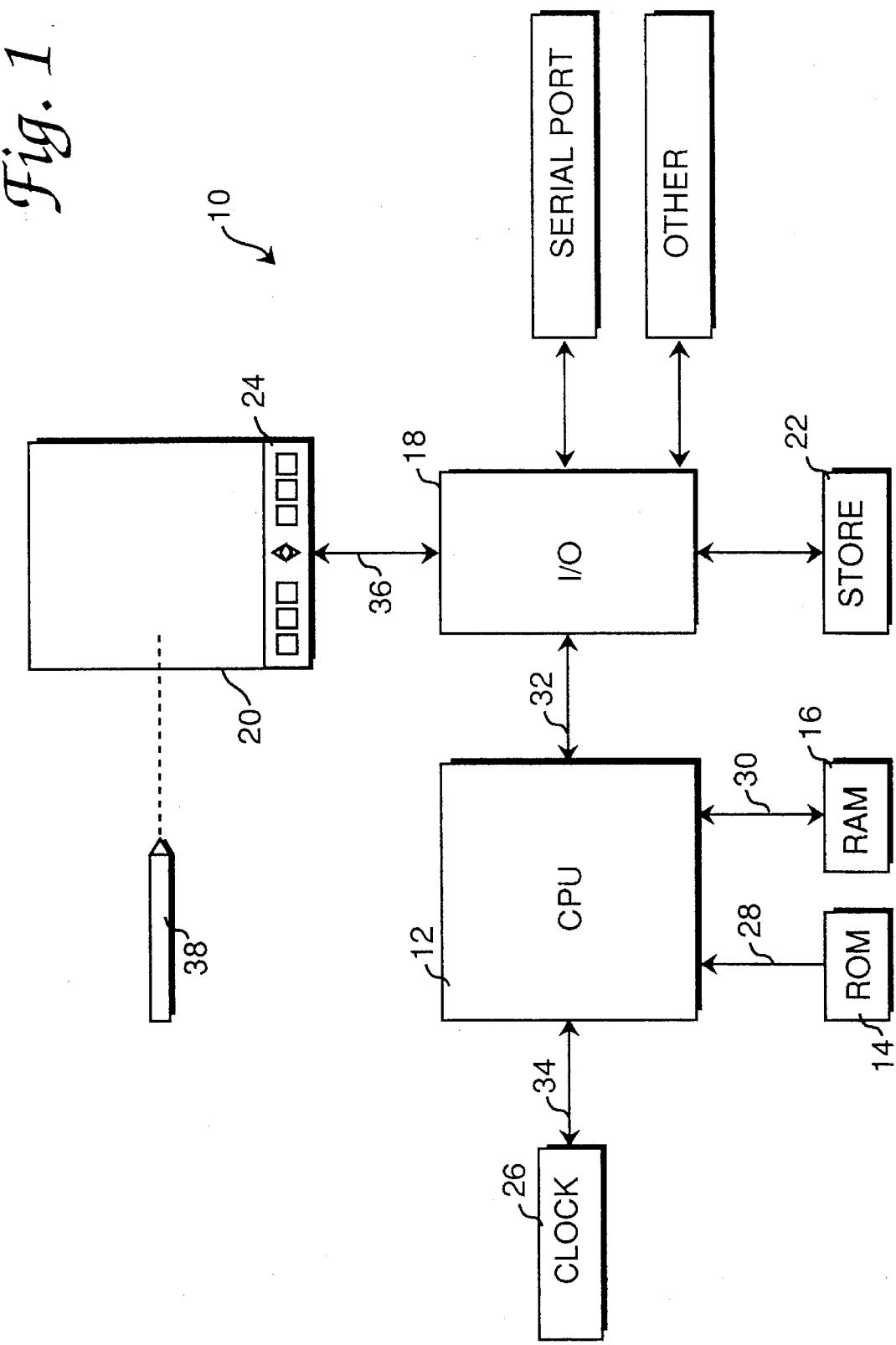
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 provides a series of clock pulses and is typically coupled to an interrupt port of CPU 12 by a data line 34. The clock pulses are used to time various functions and events relating to the computer system 10. The clock 26 can be eliminated and the clock function replace by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, nonvolatile memory such as flash memory, battery backed RAM, PC-data cards, or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
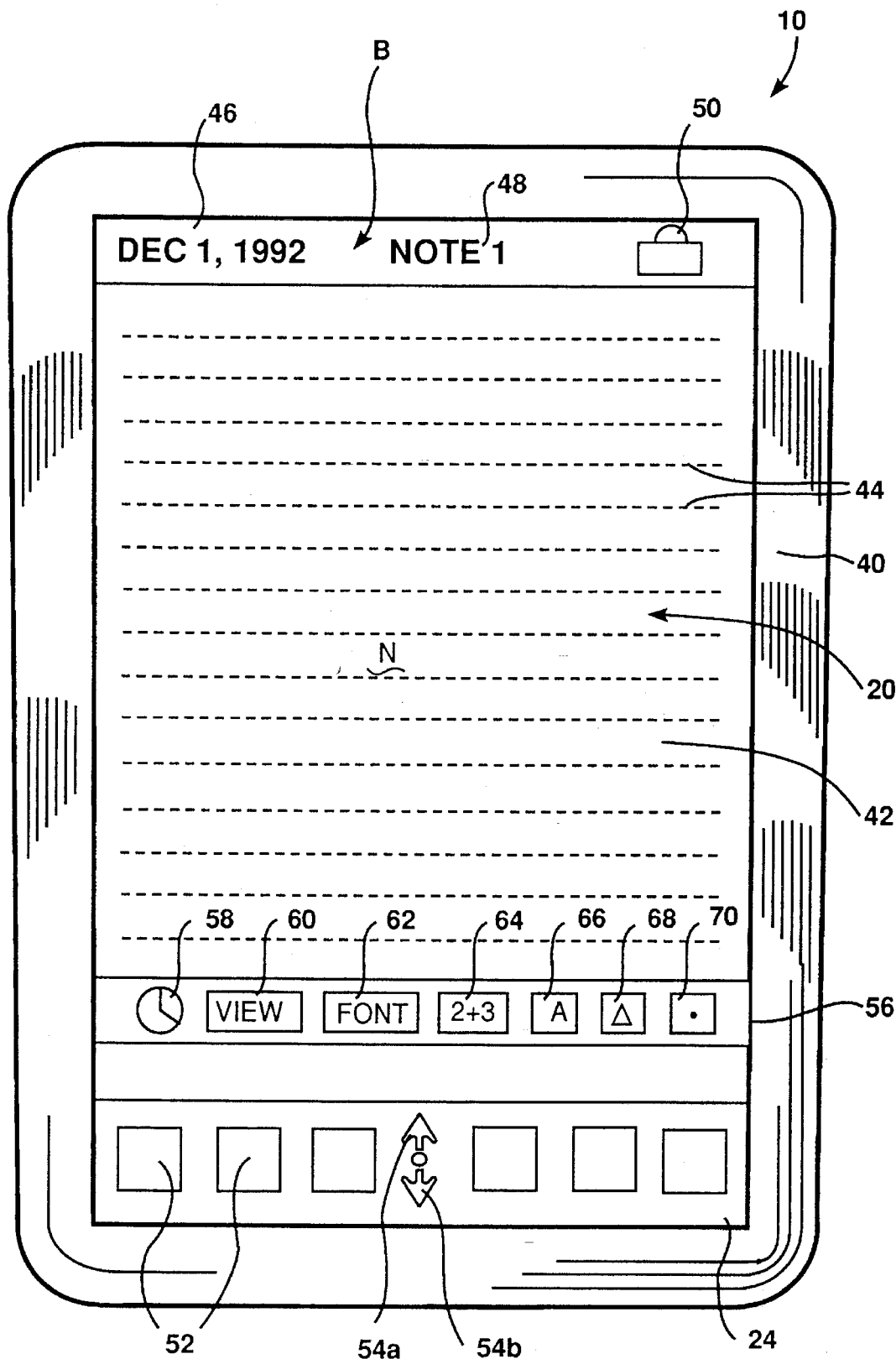
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50 represented by a toolbox icon. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application Ser. No. 07/868,013, filed Apr. 13, 1992, now U.S. Pat. No. 5,398,310, on behalf of Tchao et al. and entitled "Method for Manipulating Notes on a Computer Display". That application is assigned to the assignee of the present application and its disclosure is hereby incorporated by reference in its entirety. In this embodiment, the toolbox button 50 is represented as a "soft button" in the header bar B. However, in alternative embodiments, a permanent, hardwired keypad button could be used in its place.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, a formulas button 64, a text button 66, a graphics button 68, and a nib button 70.

The real time clock 58 is an example of a "global" active area which derives information or controls of function not necessarily associated with the application window to which it is attached. The buttons 60 and 62 are examples of active areas which provide indirect control over the notepad function. For example, pressing the font button 62 will pop up a window providing a selection of fonts which can be used when writing within the notepad window. Buttons 64–70 are examples of active areas which provide direct control over the notepad application. For example, the button 70 controls the nib size of the "ink" produced by the stylus within the application window area. Buttons 64–68 aid in recognizing writings made in the window area.

Figure 3:
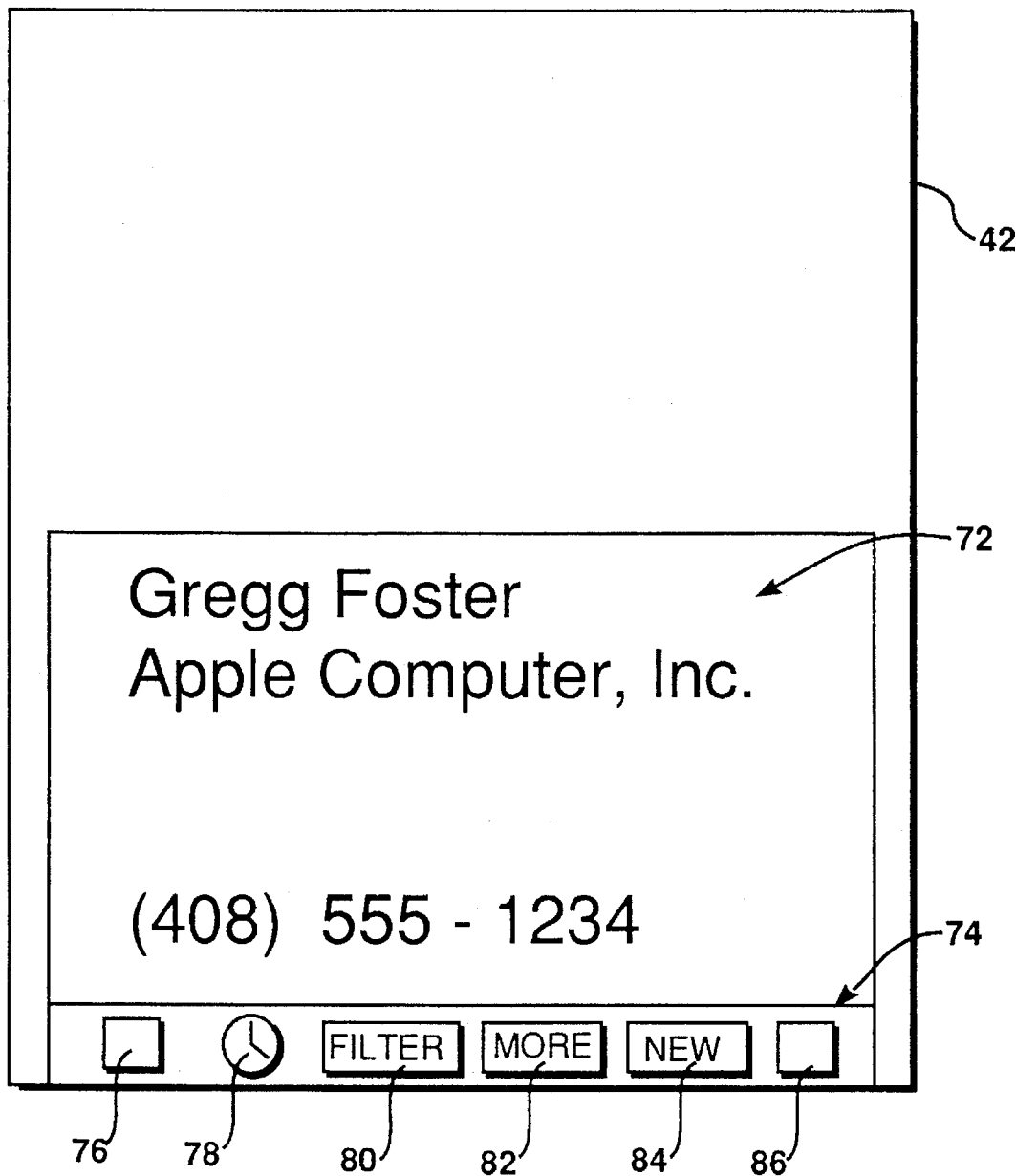
FIG. 3 illustrates a first screen display showing a pop-up window with a status bar.

FIG. 3 illustrates a window produced by a "cardfile" application program. U.S. patent application Ser. No. 07/955,839 filed Oct. 2, 1912, now U.S. Pat. No. 5,446,882, on behalf of Capps et al., entitled "Computerized Database With Card & List Interface" and assigned to the assignee of the present invention describes the operation of such a cardfile application, and is incorporated herein in its entirety by reference.

In FIG. 3, the screen 42 is provided with a window 72 associated with the card file application. In this instance, the window assumes the size and shape of a business card and displays the name, company and telephone number of a Mr. Gregg Foster. It should be noted that the window 72 is considerably smaller than the screen 42 in this example, leaving the possibility of additional windows being opened on the screen 42 in an overlapping or non-overlapping fashion.

Status bar 74 is attached to the bottom of window 72 by the process of the present invention. The status bar 74 includes a number of active areas including a close box 76, a real time clock 78, a filter button 80, a "more" button 82, a "new" button 84, and a routing slip 86. The close box 76 is an active area which permits the card file application to be closed, i.e. is either "made invisible" or is completely deactivated. The real time clock 78 is, once again, an active area carrying global information which is not necessarily associated with that particular application. The filter button 80 does not act directly upon the card file application but, rather, pops up a menu of filter parameters (e.g., business, personal, etc.) and permits a user to choose one of the filters to act upon the application program. The more button 82 is an active area which controls the card file application program to permit more or less information to be displayed on the screen 42. The new button 84 is an active area which permits a new "business card" to be entered into the card file application.

The function of the routing slip button 86 will be discussed in greater detail with reference to FIG. 4. When a user presses the routing slip button 86, a window 88 pops up from the status bar 74 to provide a list of options concerning the desired disposition of the information displayed within window 72. For example, the information in window 72 can be faxed by pressing on "fax" within window 88, can be deleted by pressing "trash" within window 88, etc.

Figure 4:
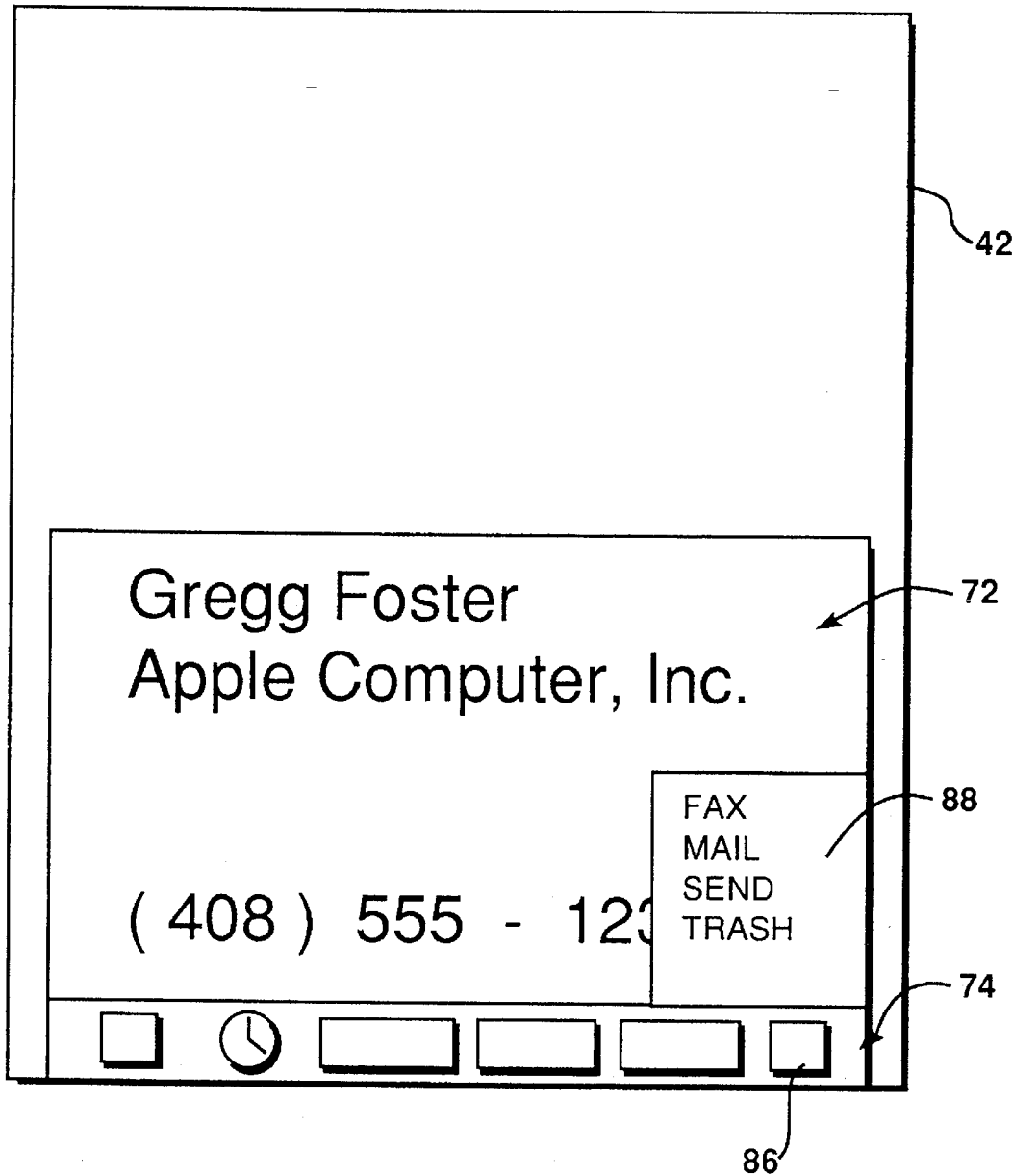
FIG. 4 is a view of the screen where a pop-up window has been activated from the status bar.
Figure 5:
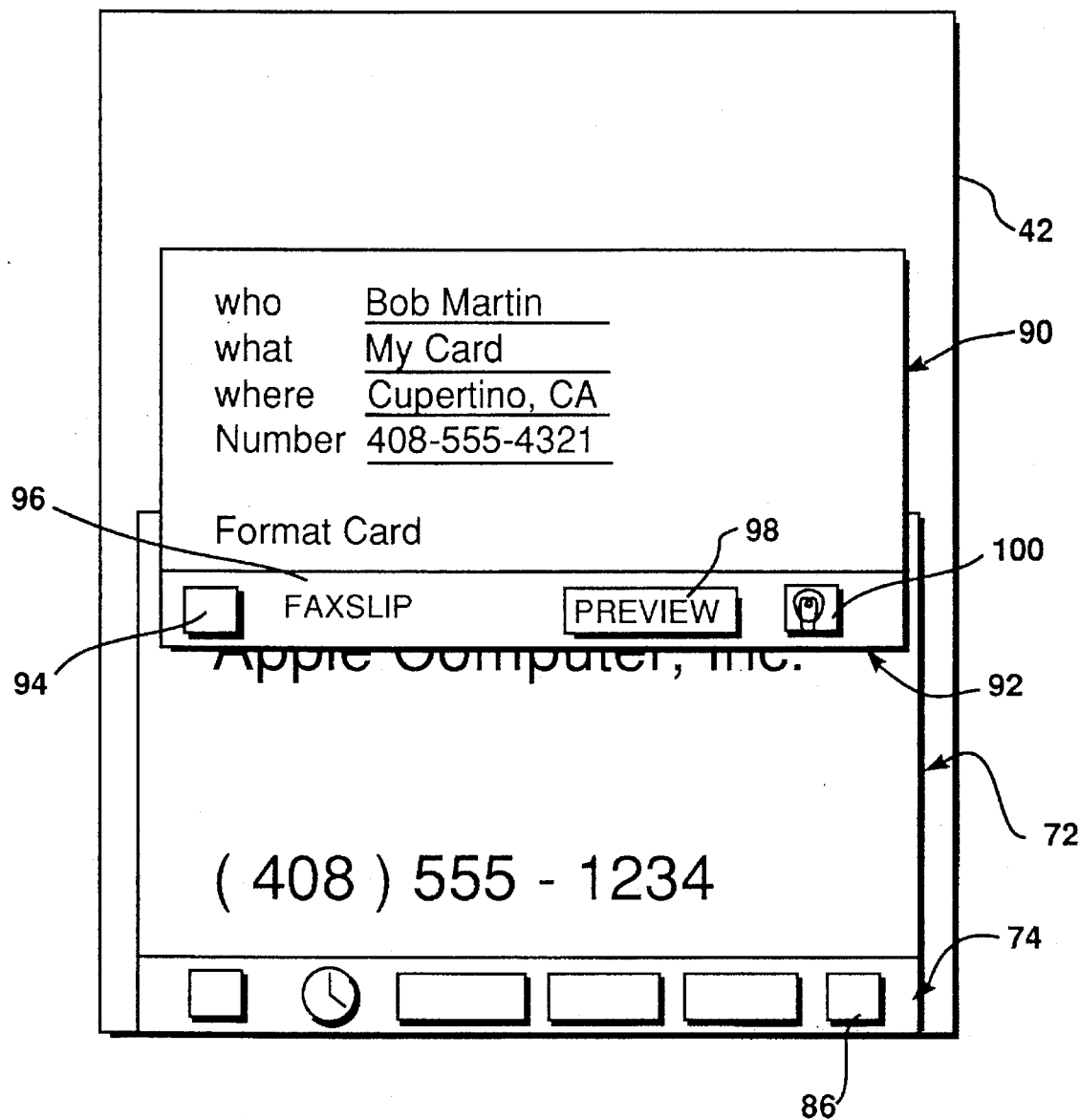
FIG. 5 is a view of the screen where a second window has been opened with an associated status bar.

FIG. 5 illustrates the result if "fax" is chosen from window 88 of FIG. 4. The selection of "fax" within the window 88 starts an application program which is provided with a floating window 90 which partially overlies the window 72 of the card file application. The window 90 includes a number a fields to be filled in by the user including a who, what, where, and a number field. The window 90 also permits the user to indicate the format of the facsimile, which in this case, is "card".

Attached to the bottom of the fax application window 90 is a status bar 92. The status bar has four active areas including a closing box 94, an information area 96, a preview button 98, and a "do it" button 100. The close box 94 operates as in previous examples, i.e., it closes the window 90 for the fax application program. The information area 96 displays information concerning the fax application; in this case, it displays the title of the application program. Preview button at 98 permits a preview of the image that is to be faxed, and the do it button 100 starts the faxing process. If a user activates the closing box before activating the do it button, the fax will not be sent.

Figure 6:
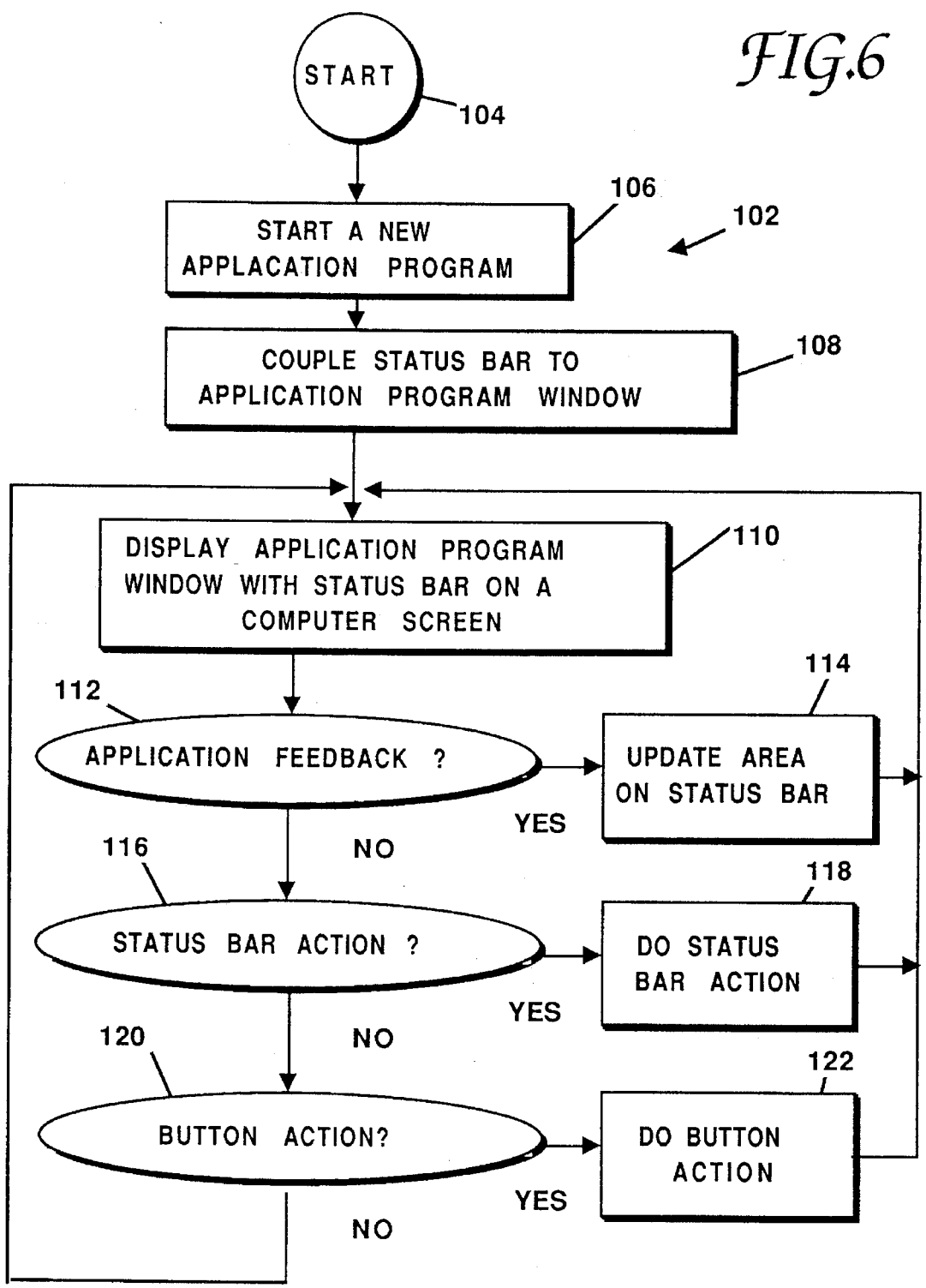
FIG. 6 is a flow diagram of a method for providing a status bar in accordance with the present invention.

FIG. 6 illustrates a flow diagram of a process 102 for providing a status bar for application windows. The process begins at 104 and starts a new application program in a step 106. Next, in a step 108, a status bar is coupled to the application program window. After the status bar is coupled to the application program window, the application program window with status bar is displayed on a computer screen in a step 110. Next, in a step 112, the process determines whether there is any feedback from the application program to the status bar. If there is, the appropriate area oil the status bar is updated in a step 114. If there is no application feedback, is determined whether there is any status bar action in a step 116. If there is, then the status bar action is processed in a step 118. If there is no status bar action detected in step 116, then it is determined whether if there was an button action in step 120. If so, then the button action is processed in the step 122. If there is no application feedback (step 112), status bar action (step 116), or button action (step 120) then process control is returned to step 110 or the application program continues to be displayed on the screen. After the completion of steps 114, 118, and 122, process control is also returned to step 110.

It should be noted that the flow diagram of FIG. 6 is a conceptual representation of the functioning of the process of the present invention, but that the process can be implemented in a variety of manners. For example, the process steps 112, 116, and 120 are preferably accomplished in parallel within the context of a "view system". In such a view system, various "views" or "objects" are stacked on top of each other, like pages of paper on a desk top. These views include a root view (such as the notepad) and virtually any number of views (within the limitations of the system) stacked on top of the root view.

The view system is a software routine which returns two pieces of information when the screen "tapped" by a stylus.

A first piece of information returned which view or "object" was tapped. The second piece of information returned is the position of the tap on the tapped view. This location information is often returned in the form of Cartesian (x-y) coordinates. The view system therefore handles much of the routine input work for the computer system. Taps by stylus on non-active areas of the screen can be ignored by the view system. Likewise, inappropriate inputs on active areas of the screen can be ignored or can generate error conditions which may or may not be acted upon by the system.

Figure 7:
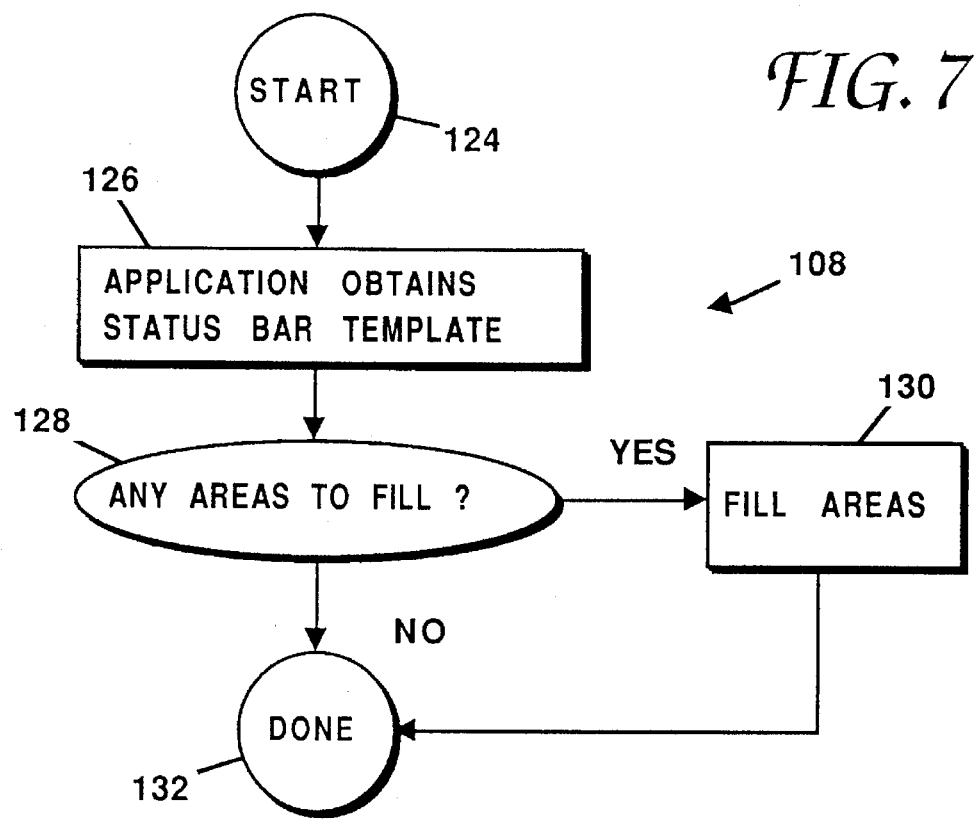
FIG. 7 is a flow diagram illustrating, in greater detail, the "Couple Status Bar" step of FIG. 6.

The flow diagram of FIG. 7 illustrates the "Couple Status Bar" step 108 of FIG. 6 in greater detail. The process starts at 124, and in a step 126 the application obtains a status bar template. The application determines whether there are any areas to fill in the template in a step 128 and, if there are, it fills the areas in a step 130. If there are not any areas to fill in step 128 or after the completion of step 130, the step 108 is completed as indicated at 132.

FIGS. 8A–8D illustrate a collection of templates which can be used by different application programs. These templates are preferably provided in the form of "objects". As is well known to software programmers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well know texts which describe object oriented programming. See, for example, Object Oriented Programming for the Macintosh, by Kurt J. Schmucher, Hayden Book Company, 1986.

Figure 8A:
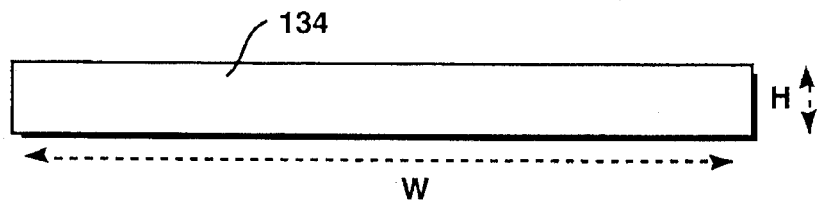
FIGS. 8a–8b illustrate several status bar templates.

In FIG. 8A, a generic or base template 134 is simply defined by a height H and a width W. An application program can provide any desired active areas it wishes anywhere in contact with the template 34.

Figure 8B:
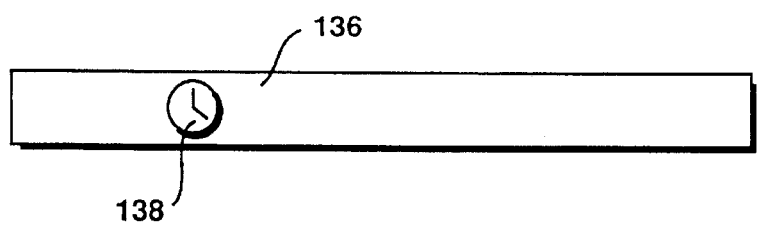

In FIG. 8B, a template 136 which is used by the notepad application has one predefined active area 138 corresponding to the real time clock. Therefore, every time that the notepad application is opened, the status bar associated with the notepad application window will necessarily include real time clock 138. Other active areas can be specified by the notepad application.

Figure 8C:
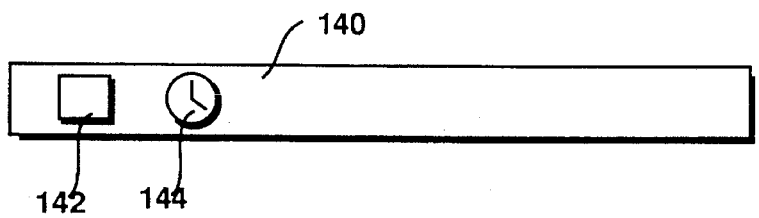

In FIG. 8C, another template 140 is provided with two predefined active areas 142 and 144 corresponding to a close box and a real time clock, respectively. This template 140 is associated with such applications as the aforementioned card file application.

Figure 8D:
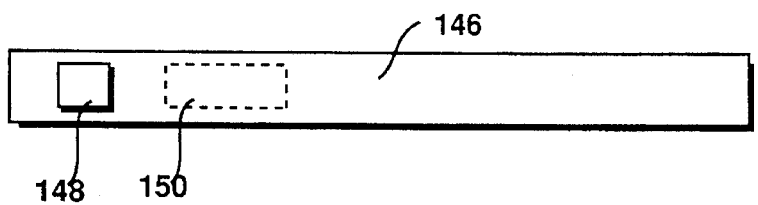

In FIG. 8D, a template 146 is provided with two predefined active areas 148 and 150. This template 146 is associated with the routing slip and active area 148 is the close box and area 150 is a mandatory information area. The remaining portions of the template 146 can be filled in as desired by the routing slip application.

Preferably, there are a number of different, specialized status bar templates available to various applications. Alternatively, a single, generic status bar template can be provided, at the cost of increased work in each application program to customize the status bar for its own use. Therefore, the step 126 of FIG. 7 can comprise either choosing one of a plurality of templates or choosing the only template that is provided.

Figure 9:
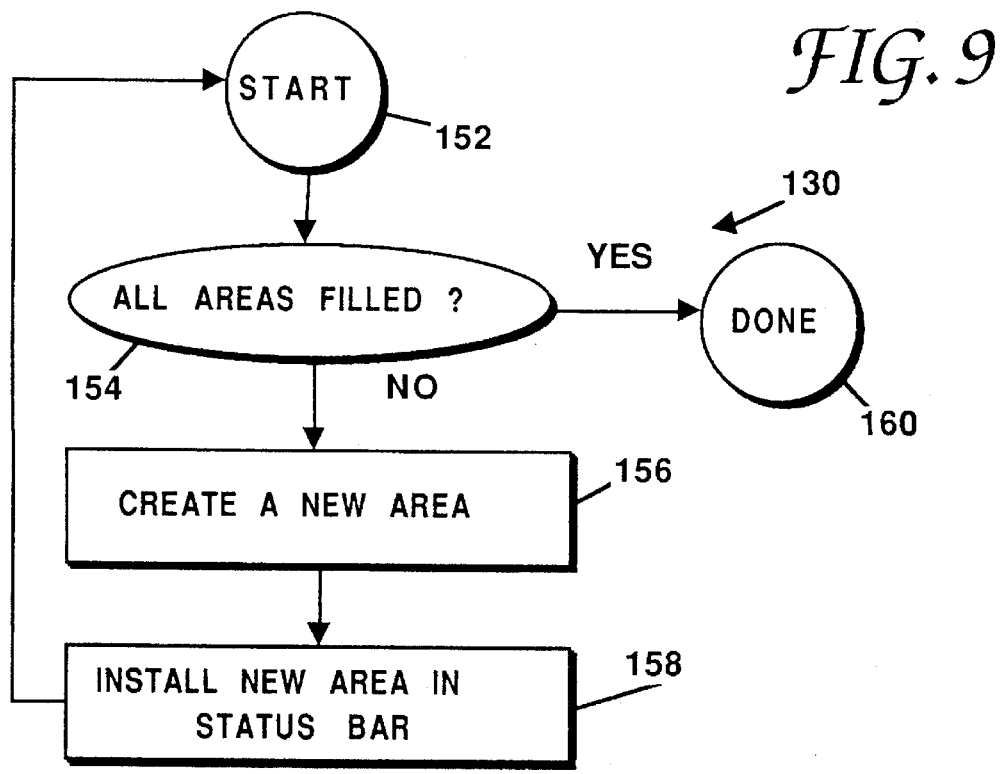
FIG. 9 illustrates the "Fill Areas" step 130 of FIG. 7.

FIG. 9 is a flow diagram illustrating the "Fill Areas" step 130 of FIG. 7 in greater detail. The step 130 begins at 152 and asks in a step 154 whether all the areas have been filled. In the first time through the loop of step 130, the answer for this would, of course, be "no". In this instance a new area would be created in step 156 and the new area would be installed in a step 158. Process control is then returned to step 154. When all areas have been filled, the step 130 is completed as indicated at 160.

Figure 10:
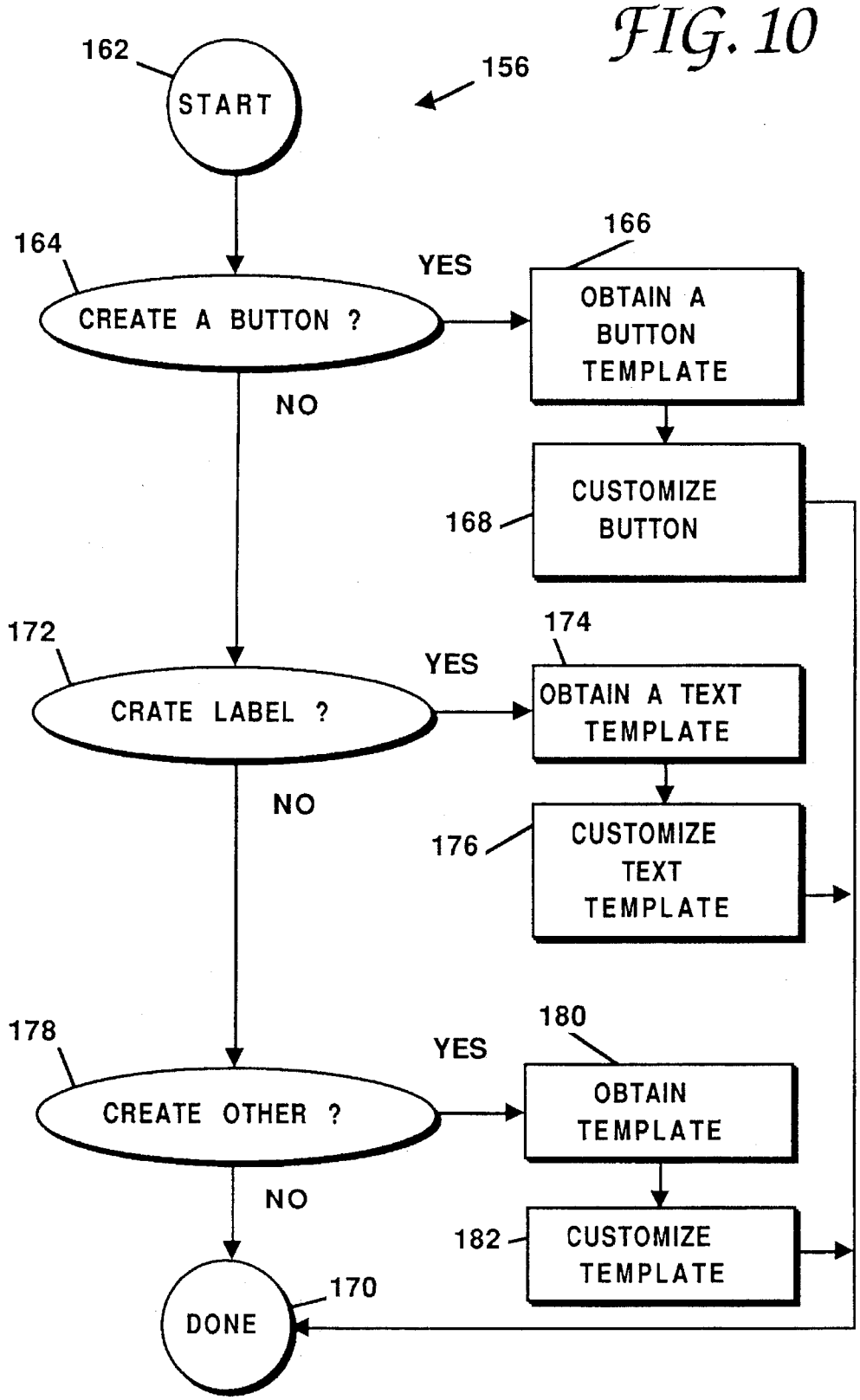
FIG. 10 is a flow diagram illustrating the "Create a New Area" step 156 of FIG. 9.

In FIG. 10, the step 156 "Create a New Area" of FIG. 9 is illustrated in greater detail. The step 156 begins at 162 and a step 164 determines whether a button is to be created. If so, a button template is obtained in a step 166, and is customized in a step 168. The process would then be completed as indicated at 170. If step 164 determines that a button is not to be created, a step 172 determines whether a label is to be created. If so, a text template is obtained in a step 174, the text template is customized in a step 176, and the step 156 is completed as indicated at 170. If neither a button or label is to be created, a step 178 determines whether there are any other types of areas to be created. If so, a template is retrieved in a step 180 and customized in a step 182. If step 178 determines that there are not any other areas to create or after the completion of step 182, the step 156 is completed as indicated at 170.

As seen in FIG. 11, after step 130 of FIG. 9 is completed, a status bar 184 is provided including a template 186 and a number of active areas 188, 190, 192, 194, 196, and 198. The status bar 184 can be handled as a single object comprising a template object 186 and a number of button, label, or other area objects 188–198. This status bar object 184 is then ready to be attached or coupled to an application program window as indicated in step 108 of FIG. 6.

Since the status bar 184 has been customized for and attached to a particular application window, it is completely unambiguous as to which window that status bar controls. Nonetheless, the status bars provide a common interface in that they are all similar at least at the generic template level. A user will always know that an application window will have a status bar attached to it and that certain similar application programs will have similar active areas. For example, all status bars will include a "close box" except for the status bar for the notepad.

The use of object oriented programming and the aforementioned view system simplifies the implementation of the process of the present invention. In FIG. 12A, a conceptual representation of various objects is shown. The screen 42 forms a base or root layer, and a window 200 associated with an application program forms a second layer above the base or root layer. The template 186 is positioned over the window object 200, and the various areas 188–198 are positioned over the template 186.

In FIG. 12B, a side elevation taken along line 12b–12b of FIG. 12A again illustrates the conceptual layering of various objects. The aforementioned viewing system automatically handles "taps" of the stylus 38 on the screen 42 by returning information concerning which object has been tapped and where on the object that the tap occurred. For example, a tap A on the screen 42 would create an action for whatever application was displayed on that area of the screen. For example, the tap might activate the notepad on the screen 42. A tap B on the window 200 could potentially cause an interaction with the application program being displayed within that window 200. A tap C on the template 164 could be part of a gesture formed on that template or it could be of part of a drag action. A tap D on close button 188 would cause the application window 200 to close. It is therefore clear that the object oriented programming and view system software makes the implementation of the process 102 of FIG. 6 a relatively less cumbersome process than traditional programming techniques.

Figure 13:
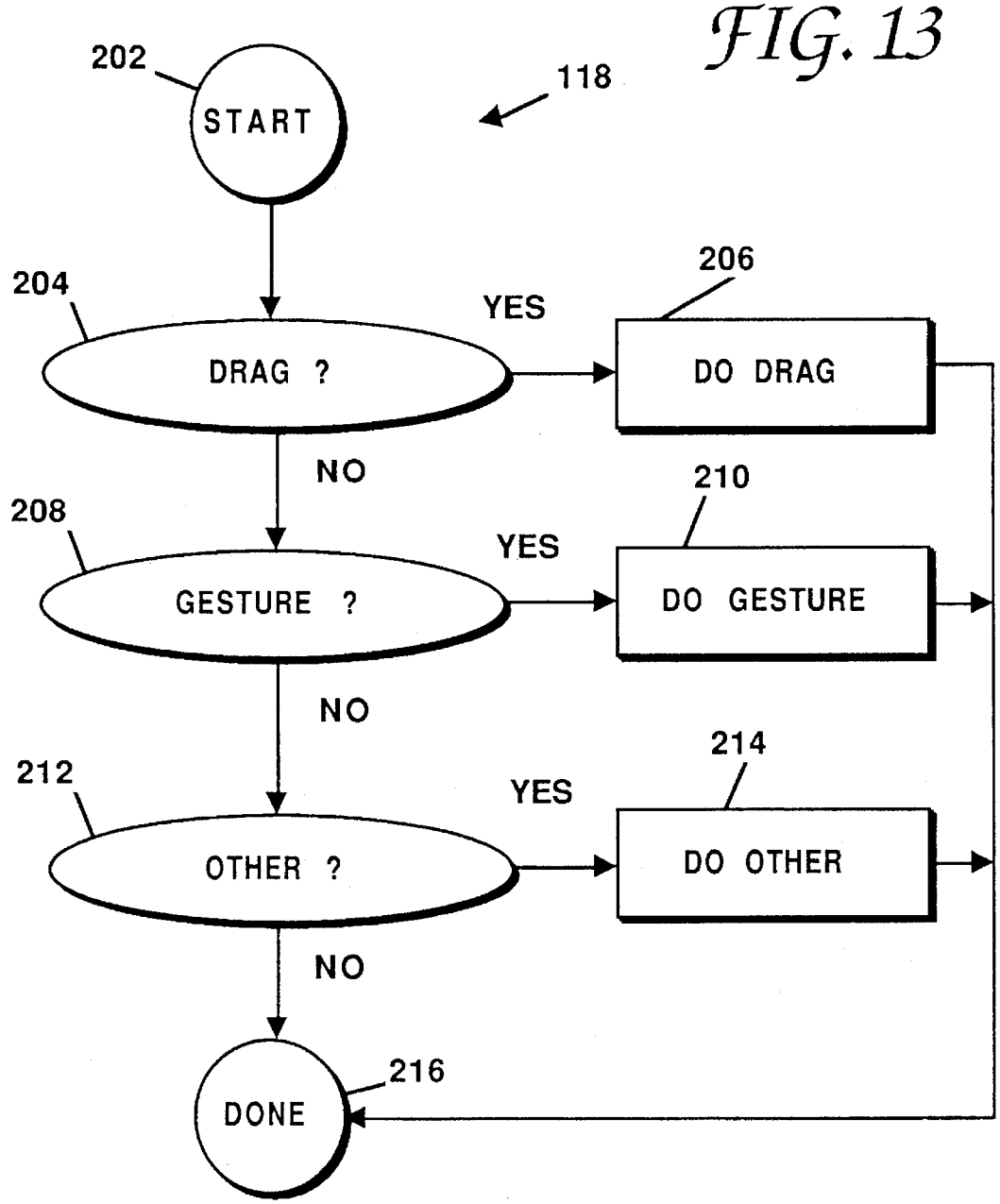
FIG. 13 is a flow diagram illustrating the "Do Status Bar Action" step 118 of FIG. 6.

In FIG. 13, the "Do Status Bar Action" step 118 of 6 is illustrated in greater detail. The process 118 begins at 202 and step 204 determines whether a drag action is being performed. A drag action could be indicated by placing the tip of the stylus 38 on a portion of the template and then moving the tip of the stylus across the screen 42. This would cause both the status bar and the attached window to move in a step 206. If the drag action is not being indicated, it is determined in a step 208 whether a gesture action is being indicated. An example of a gesture is a "scrub" gesture which could close the window. If a gesture is being indicated, then step 210 performs the gesture. Other actions might be detected in a step 212 in which case other actions could be taken in a step 214. After the completion of steps 206, 210, 214, or if recognizable meaning is associated with status bar action 118, the process is completed as indicated at 212.

While this invention has been described in terms of several preferred embodiments, there are alterations, permutations, and equivalents which fall within the scope of this invention. For example, the status bar could take other forms than a bar, e.g. it could take the form of a "status slip" of any convenient shape. Also, the status bar could be attached to the top or side of the window or within the window. In fact, the status bar does not have to actually touch the window as long as it is clearly associated with the window. For example, the status bar could be provided within a small distance of each window, or it could be provided farther from a window and be coupled to the window by a line or the like.

It is therefore intended that the following appended claims be interpreted as including all such alterations, permutations, and equivalents as fall within the true spirit and scope of the present invention.

What is claimed is:

1. A computer system for displaying a status bar for a window of an application program comprising:

a central processing unit (CPU);

read/write memory coupled to said CPU;

a computer screen coupled to said CPU;

means for selecting a status bar template from a plurality of predefined status bar templates, said selected status bar template to be associated with an application program, each of said plurality of status bar templates being able to provide a status bar for different application programs usable on said computer system and each template including a different number or type of active area;

means for providing a status bar from said selected status bar template independently of said application program and independently of an application window of said application program;

means for displaying said status bar on said computer screen such that said status bar is displayed external to said window and is visibly associated with a window of said application program which is also displayed on said computer screen, wherein said status bar is associated only with said application program and is always displayed when said window of said associated application program is displayed; and means for displaying an active area within said status bar, said active area always being displayed within said status bar and being unable to be removed from said status bar while said status bar is displayed, said active area including an icon or a label.

2. A computer system for displaying a status bar as recited in claim 1 wherein said status bar is displayed in contact with said window.

3. A computer system for displaying a status bar as recited in claim 2 wherein a plurality of active areas are displayed within said status bar.

4. A computer system for displaying a status bar as recited in claim 2 wherein said active area includes said icon which, when activated, controls an operation of said application program.

5. A computer system for displaying a status bar as recited in claim 4 wherein said icon comprises a button which can be activated to control said operation.

6. A computer system for displaying a status bar as recited in claim 4 wherein said icon comprises a close box which can be activated to close said application program window.

7. A computer system for displaying a status bar as recited in claim 2 wherein said active area displays information provided by said application program.

8. A computer system for displaying a status bar as recited in claim 2 wherein said active area displays information not provided by said application program.

9. A computer system for displaying a status bar as recited in claim 8 wherein said information comprises the current time of day displayed in the form of a clock.

10. A computer system for displaying a status bar as recited in claim 2 wherein said active area controls a function which indirectly controls an operation of said application program.

11. A computer system for displaying a status bar as recited in claim 10 wherein said active area opens a new window on said computer screen.

12. A computer system for displaying a status bar as recited in claim 11 wherein said application window displays data provided by said application program, and wherein said new window comprises a menu of possible operations to be performed on said data displayed by said application program.

13. A computer system as recited in claim 1 further comprising means for moving said status bar template across said computer screen, wherein when said status bar template is moved, said application window associated with said status bar template is also moved across said computer screen.

14. A computer system as recited in claim 13 wherein said status bar is a selectable object, and wherein said means for moving said status bar includes a pointer for selecting objects displayed on said computer screen, wherein said status bar is moved by selecting said status bar and dragging said status bar across said computer screen with said pointer.

15. A computer system as recited in claim 1 wherein each of said status bar templates includes a different number or type of predefined active areas and customized active areas, where said predefined active areas are always included, unchanged, in a status bar provided frown an associated status bar template, and wherein said customized active areas are filled in said template by said application program.

16. A computer system as recited in claim 1 wherein each of said status bar templates is associated with types of application programs used on said computer system such that similar application programs are associated with status bar templates having similar action areas.

17. A method for providing a status bar for an application window on a computer screen of a computer system, the method comprising the steps of:

creating a plurality of status bar templates from each of which one or more status bars can be provided for different application programs usable on a computer system, each of said status bar templates having at least one area to be filled and having a different number or type of said area from other status bar templates so that each template provides a status bar having a different appearance than status bars provided from other templates;

selecting one of said plurality of status bar templates to be associated with an application program having an associated application window displayed on said computer screen, such that only said selected status bar template is associated with said application window;

filling said area of said selected status bar template with an active area to create a status bar, said active area being filled in by said application program; and displaying said status bar on a computer screen such that it is visually associated only with said application window and is external to said application window, said status bar always being displayed when said application window is displayed, wherein information associated with said application window is always displayed in said active area of said status bar when said status bar is displayed and wherein said information is always displayed in a same location within said status bar and is unable to be moved within said status bar.

18. A method for providing a status bar as recited in claim 17 wherein said status bar is displayed on said computer screen such that it contacts said application window.

19. A method for providing a status bar as recited in claim 18 wherein said status bar includes an active area which controls a function of said application program.

20. A method for providing a status bar as recited in claim 18 wherein said status bar includes an active area which displays information generated by said application program.

21. A method for providing a status bar as recited in claim 18 wherein said status bar includes an active area which displays information derived outside of said application program.

22. A method for providing a status bar as recited in claim 18 wherein said status bar includes an active area which controls a function outside of said application program.

23. A method for providing a status bar as recited in claim 17 wherein a plurality of active areas are filled in and displayed in said status bar, wherein at least one of said plurality of active areas is a predefined active area not filled in by said application program.

24. A method for providing a status bar as recited in claim 17 wherein a plurality of application windows, each associated with an application program, are displayed, and wherein a plurality of status bars corresponding to said plurality of application windows is displayed, wherein each status bar is visibly associated with a different one of said application windows.

25. A method as recited in claim 17, wherein each of said status bar templates is previously associated with types of application programs used on said computer system such that templates having similar action areas are selected to be associated with similar application programs.

26. A method as recited in claim 17 wherein said active area filled into said area by said application program is a customized active area, and wherein at least one of said status bar templates includes at least one predefined active area that is always included in a status bar generated from said template having said predefined active area.

27. A method as recited in claim 26 wherein said customized active area is created by selecting an active area template from a plurality of predefined active area templates and generating said customized active area from said selected active area template.

28. A method as recited in claim 27 wherein said active area templates include a button template for providing a button active area on said status bar and a text template for providing a label active area on said status bar.

29. A computer system for displaying a status bar for a window of an application program comprising:

a central processing unit (CPU);

read/write memory coupled to said CPU;

a computer screen coupled to said CPU;

a tablet receptive to a stylus, said tablet being coupled to said CPU;

means for selecting a status bar template for an application program from a collection of available, predefined status bar templates, where said selecting occurs independently of said application program and independently of an application window of said application program, each of said status bar templates including a plurality of areas that are different in number or function from areas of other status bar templates in said collection, wherein each of said status bar templates can be used to provide a status bar for different application programs executed by said CPU and wherein each of said status bar templates is associated with a type of application program used on said computer system such that similar application programs are associated with particular status bar templates to provide a common status bar appearance for said similar application programs:

means for providing a status bar from said selected status bar template and displaying said status bar on said computer screen such that said status bar visibly contacts an application window of said application program which is also displayed on said computer screen, said status bar being displayed outside a perimeter of said application window, wherein said status bar is associated only with said application window and is only displayed when said application window of said associated application program is displayed; and means for displaying a plurality of active areas in said areas of said selected template such that said active areas are displayed within said status bar, said plurality of active areas always being displayed and being unable to be removed from said computer screen when said status bar is displayed, said plurality of active areas including a button which can be selected by said stylus on said tablet to control an operation of said application program.

30. A computer system for displaying a status bar as recited in claim 29 wherein at least one of said plurality of active areas displays information provided by said application program.

31. A computer system for displaying a status bar as recited in claim 29 wherein at least one of said plurality of active areas displays information not provided by said application program.

32. A computer system for displaying a status bar as recited in claim 29 wherein said button, when selected, causes a new application program to start and a new application window associated with said new application program to be displayed on said computer screen, such that:

said means for selecting a status bar template selects a new status bar template from said collection of status templates for said new application window;

said means for displaying said status bar displays said new status bar such that it visibly contacts said new application window external to said new application window, wherein said new status bar is associated only with said new application window and is always displayed when said new application window is displayed; and said means for displaying a plurality of active areas displays a new plurality of active areas within said new status bar, said plurality of new active areas always being displayed and being unable to be removed from said computer screen when said new status bar is displayed.

33. A computer system for displaying a status bar as recited in claim 29 wherein said status bar is a selectable object, and further comprising means for dragging said status bar across said computer screen when said stylus points to said status bar and is moved, wherein said associated application window is moved when said status bar is dragged.

34. A computer system as recited in claim 29 wherein at least one of said status bar templates includes a predefined action area in one of said areas, said predefined action area always being included in a status bar provided from said status bar template.

35. A computer system as recited in claim 34 wherein said status bar includes a customized active area which is filled into one of said areas by said application program.

36. A computer system as recited in claim 35 wherein said customized active area is provided by selecting an active area template from a plurality of available, predefined active area templates and generating said customized active area from said selected active area template.

37. A method for providing a status bar for an application window on a computer screen of a computer system, the method comprising the steps of:

creating a plurality of status bar templates from which one or more status bars can be provided, wherein a status bar can be provided for application programs using any of said status bar templates each of said status bar templates having a plurality of areas, and wherein each of said status bar templates has a different number or type of predefined active areas filled into at least one of said areas and at least one empty area, wherein said predefined active areas are always included in status bars derived from said status bar templates;

selecting one of said plurality of status bar templates to be associated with an application program having an associated application window displayed on said computer screen;

filling said empty area of said selected status bar template with a customized active area to create a status bar, said empty area being associated with and filled in by said application program, said status bar including said status bar template, said predefined active areas, and said customized active area; and displaying said status bar on a computer screen such that it is visually associated only with said application window, said status bar always being displayed when said application window is displayed, wherein information associated with said application window is always displayed in said customized active area of said status bar when said status bar is displayed and wherein said active areas are always displayed in a same location within said status bar and are unable to be moved within said status bar.

38. A method as recited in claim 37 wherein types of application programs running on said computer system and particular status bar templates are associated with each other such that similar application programs are associated with templates having similar predefined action areas and empty areas to provide a common status bar appearance for said similar application programs.

39. A method as recited in claim 37 further comprising creating a plurality of active area templates, and wherein said customized active area is provided by selecting one of said active area templates from said plurality of active area templates and generating said customized active area from said selected active area template.

40. A method as recited in claim 39 wherein said active area templates include a button template for providing a button active area on said status bar and a text template for providing a label active area on said status bar.

\* \* \* \* \*